US008581883B2

(12) United States Patent
Jeon et al.

(10) Patent No.: US 8,581,883 B2
(45) Date of Patent: Nov. 12, 2013

(54) SENSOR SCAN DRIVERS, FLAT PANEL DISPLAYS WITH BUILT-IN TOUCH SCREEN INCLUDING SUCH A SENSOR SCAN DRIVER, AND METHODS OF DRIVING SUCH FLAT PANEL DISPLAYS

(75) Inventors: Mu-Kyung Jeon, Yongin (KR); Sang-Uk Kim, Yongin (KR); Hee-Chul Hwang, Yongin (KR); Hideo Yoshimura, Yongin (KR); Jin-Woo Park, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 701 days.

(21) Appl. No.: 12/805,942

(22) Filed: Aug. 25, 2010

(65) Prior Publication Data

US 2011/0096027 A1    Apr. 28, 2011

(30) Foreign Application Priority Data

Oct. 22, 2009    (KR) .................. 10-2009-0100643

(51) Int. Cl.
*G06F 3/042*    (2006.01)

(52) U.S. Cl.
USPC ............. 345/175; 345/207; 345/46; 345/214; 345/204; 377/71; 377/73

(58) Field of Classification Search
USPC ........................................................ 345/175
See application file for complete search history.

(56) References Cited

U.S. PATENT DOCUMENTS

| 6,023,307 | A | * | 2/2000 | Park .............................. 349/24 |
| 7,023,415 | B2 | * | 4/2006 | Fujita et al. ..................... 345/98 |
| 7,430,025 | B2 | | 9/2008 | Okamoto et al. |
| 2005/0243588 | A1 | * | 11/2005 | Kubota et al. .................. 365/63 |
| 2005/0276369 | A1 | * | 12/2005 | Mutaguchi ..................... 377/64 |
| 2008/0158461 | A1 | * | 7/2008 | Kenmochi et al. ............. 349/46 |
| 2008/0170009 | A1 | * | 7/2008 | Eom ............................... 345/76 |
| 2009/0273580 | A1 | * | 11/2009 | Ota et al. ....................... 345/175 |

FOREIGN PATENT DOCUMENTS

| JP | 10-177162 A | 6/1998 |
| JP | 2003-308049 A | 10/2003 |
| KR | 10-2005-0095215 A | 9/2005 |
| KR | 10 2006-0088510 A | 8/2006 |
| KR | 10-2007-0028727 A | 3/2007 |

* cited by examiner

*Primary Examiner* — Kent Chang
*Assistant Examiner* — Benjamin Morales Fernandez
(74) *Attorney, Agent, or Firm* — Lee & Morse, P.C.

(57) ABSTRACT

A sensor scan driver may include a shift register unit for driving photodiodes, a transmission gate unit for changing a voltage range of sensor scan signals generated by the shift register unit, and a buffer unit for supplying the sensor scan signals supplied from the transmission gate unit to the photodiodes, wherein the transmission gate unit includes first and second transmission gates, each including an electrode adapted to receive an output signal of the shift register unit, another electrode adapted to receive the inverted output signal of the shift register unit, an input terminal coupled to first and second power sources, respectively, and an output terminal coupled to an output terminal of the transmission gate unit.

15 Claims, 7 Drawing Sheets

SENSOR SCAN DRIVERS, FLAT PANEL DISPLAYS WITH BUILT-IN TOUCH SCREEN INCLUDING SUCH A SENSOR SCAN DRIVER, AND METHODS OF DRIVING SUCH FLAT PANEL DISPLAYS

BACKGROUND

1. Field

Embodiments relate to a flat panel display (FPD) with a built-in touch screen and a method of driving the same. More particularly, embodiments relate to a sensor scan driver capable of supplying stable driving signals to photodiodes for performing the function of a touch screen and a FPD with a built-in touch screen including the same.

2. Description of the Related Art

A touch screen is provided on the top surface of an image display so that a person may select instruction contents displayed on the screen of the image display by a hand or an object and contacts the hand or the object. The touch screen grasps a contact position and the image display receives the content instructed by the contact position as an input signal to be driven in accordance with the input signal.

Since the image display having the touch screen does not need an additional input device, e.g., a keyboard and a mouse, coupled to the image display to be driven, the use of the image display having the touch screen is increasing.

Recently, the touch screen is widely used for the FPD such as a liquid crystal display (LCD) and an organic light emitting display (OLED). The FPD having the touch screen includes a display panel for displaying an image and a touch screen panel provided on the display panel to detect position information through touch input from a user.

When the display panel and the touch screen panel are additionally provided and the touch screen panel is attached onto the display panel, the entire optical characteristic of the FPD may deteriorate, manufacturing cost increases, and the thickness of the FPD increases. Therefore, the touch screen panel and the display panel are integrated with each other to realize the FPD with the built-in touch screen.

For example, photo sensors realized by photodiodes are formed in non-pixel regions between the pixels of the display panel so that a change in optical current generated by a touch event from the user is sensed so that a touch position may be sensed.

In the above-described FPD with the photo sensor type built-in touch screen, the plurality of photodiodes are formed on the display panel and driving signals are sequentially supplied to the photodiodes to sense the optical current.

Therefore, a sensor scan driver for sequentially supplying the driving signals to the photodiodes may be provided in the FPD with the photo sensor type built-in touch screen. The sensor scan driver may include a shift register for sequentially shifting input signals like a common scan driver and a level shifter for shifting the voltage of the signal output from the shift register to a desired level. The level shifter may include a plurality of transistors coupled between a first power source and second power source, and during transitory phases, respective ones of the transistors may be simultaneously turned on such that a path may exist between the first power source and the second power source. When such a level shifter is employed, during a transition period where a level of first and second input signals may rise from a low level to a high level or fall from a high level to a low level, leakage current may be generated and power consumption may increase. As a result of such leakage current, a circuit may erroneously operate and an output signal generated therefrom may be unstable. More particularly, e.g., when a sensor scan driver employs such a common level shifter driving signals may not be stably supplied to photodiodes of the touch screen panel.

SUMMARY

Embodiments are therefore directed to sensor scan drivers, flat panel displays including built-in touch screens and associated methods, which substantially overcome one or more of the problems due to the limitations and disadvantages of the related art.

It is therefore a feature of an embodiment to provide a sensor scan driver adapted to stably supply driving signals to photodiodes employed in a touch screen and a flat panel display (FPD) with a built-in touch screen including the same.

It is therefore a separate feature of an embodiment to provide a sensor scan driver including a transmission gate unit adapted to stably change a voltage range of sensor scan signals supplied from a shift register to output a voltage range so that driving signals may be stably supplied to photodiodes of a built-in touch screen.

It is therefore a separate feature of an embodiment to provide a sensor scan driver including a transmission gate unit adapted to stably change a voltage range of sensor scan signals supplied from a shift register to output a voltage range to improve the optical sensitivity of the photodiodes and, as a result, improve characteristics of the built-in touch screen.

At least one of the above and other features and advantages may be realized by providing a sensor scan driver, including a shift register unit adapted to sequentially generate sensor scan signals for driving a plurality of photodiodes, a transmission gate unit adapted to change a voltage range of sensor scan signals generated by the shift register unit, and a buffer unit adapted to supply the sensor scan signals supplied from the transmission gate unit to the photodiodes, wherein the transmission gate unit, includes a first transmission gate including a positive polarity control electrode that is adapted to receive an output signal of the shift register unit, a negative polarity control electrode that is adapted to receive a signal obtained by inverting the output signal of the shift register unit, an input terminal coupled to a first power source having a first voltage, and an output terminal coupled to an output terminal of the transmission gate unit, and a second transmission gate including a positive polarity control electrode that is adapted to receive the signal obtained by inverting the output signal of the shift register unit, a negative polarity control electrode that is adapted to receive the output signal of the shift register unit, an input terminal coupled to a second power source having a second voltage, and having an output terminal coupled to the output terminal of the transmission gate unit.

The first voltage may be set as a low level voltage of the sensor scan signals supplied to the photodiodes, and the second voltage may be set as a high level voltage of the sensor scan signals supplied to the photodiodes.

The first voltage may be set as the high level voltage of the sensor scan signals supplied to the photodiodes, and wherein the second voltage may be set as the low level voltage of the sensor scan signals supplied to the photodiodes.

The transmission gate unit may include at least one buffer coupled between coupling nodes of the positive polarity control electrode of the first transmission gate and the negative polarity control electrode of the second transmission gate and the shift register unit to transmit the output signal of the shift register unit to the first and second transmission gates, and at least one inverter coupled between coupling nodes of the negative polarity control electrode of the first transmission gate and the positive polarity control electrode of the second transmission gate and the shift register unit to transmit the signal obtained by inverting the output signal of the shift register unit to the first and second transmission gate.

The first and second transmission gates may be coupled to each channel of the shift register unit.

The shift register unit may include a plurality of shift registers provided in each channel, and a plurality of NAND gates coupled between the output lines of the plurality of shift registers and the corresponding channels of the transmission gate unit, wherein each of the NAND gates may perform a NAND operation on three signals of the output signal of the shift register of the corresponding channel, a first or second sensor gate clock signal, and a sensor gate output enable signal to output a NAND operation result to the transmission gate unit.

The plurality of NAND gates may alternately receive the sequentially delayed first or second sensor gate clock signal.

At least one of the above and other features and advantages may be separately realized by providing a flat panel display (FPD) with a built-in touch screen, including a plurality of unit pixels regularly arranged in a display region, photodiodes adjacent to unit pixels in units of pixel groups each including at least one unit pixel among the unit pixels, a gate driver for sequentially supplying pixel scan signals to the unit pixels, and a sensor scan driver for sequentially supplying the sensor scan signals to the photodiodes, wherein the sensor scan driver, includes a shift register unit for sequentially generating sensor scan signals for driving the photodiodes, a transmission gate unit for changing a voltage range of sensor scan signals generated by the shift register unit, and a buffer unit for supplying the sensor scan signals supplied from the transmission gate unit to the photodiodes, wherein the transmission gate unit includes a first transmission gate having a positive polarity control electrode receive an output signal of the shift register unit, having a negative polarity control electrode receive a signal obtained by inverting the output signal of the shift register unit, having an input terminal coupled to a first power source having a first voltage, and having an output terminal coupled to an output terminal of the transmission gate unit, and a second transmission gate having a positive polarity control electrode receive a signal obtained by inverting the output signal of the shift register unit, having a negative polarity control electrode the output signal of the shift register unit, having an input terminal coupled to a second power source having a second voltage, and having an output terminal coupled to the output terminal of the transmission gate unit.

A ratio of a number of photodiodes to a number of unit pixels may be no more than 1:1.

The unit pixels may include a plurality of sub-pixels that emit light components of different colors.

The unit pixels and the photodiodes may be formed on a same substrate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0100643, filed on Oct. 22, 2009, in the Korean Intellectual Property Office, and entitled: "Sensor Scan Driver and Flat Panel Display with a Built-in Touch Screen Having the Same" is incorporated by reference herein in its entirety.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements may be exaggerated for clarity of illustration. It will also be understood that when an element is referred to as being "on" another element, it can be directly on the other element, or intervening elements may also be present. Further, it will be understood that when an element is referred to as being "under" or "above" another element, it can be directly under or above, and one or more intervening elements may also be present. In addition, it will also be understood that when an element is referred to as being "between" two elements, it can be the only element between the two elements, or one or more intervening elements may also be present. Herein, when a first element is described as being coupled to a second element, the first element may be directly coupled to the second element, and may also be indirectly coupled to the second element via one or more other elements. Further, some of the elements that are not essential to the complete understanding of the invention are omitted for clarity. Like reference numerals refer to like elements throughout the specification the specification.

Figure 1:
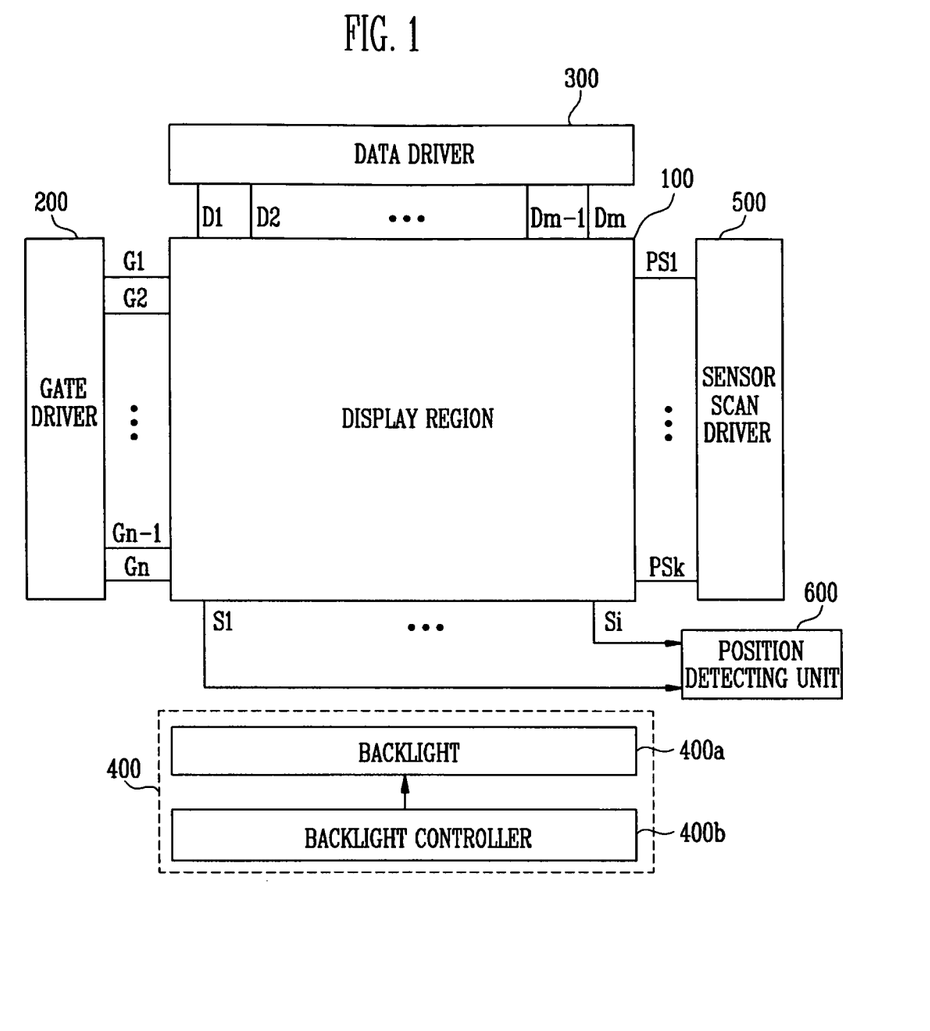
FIG. 1 illustrates a schematic diagram of an exemplary embodiment of a flat panel display (FPD) including a built-in touch screen.
Figure 2:
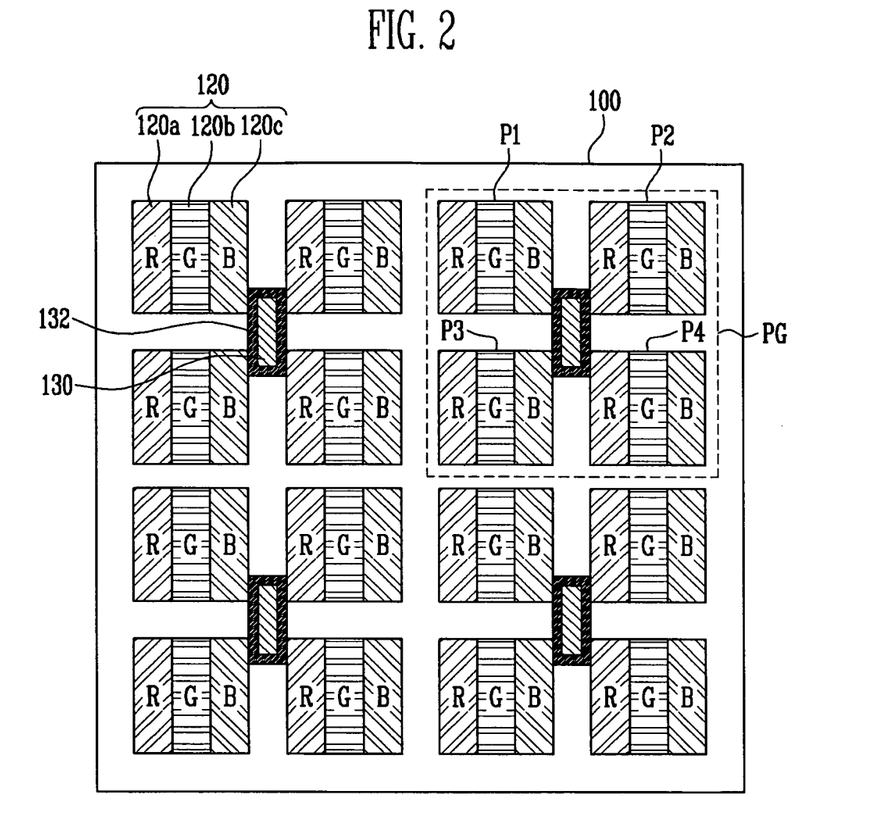
FIG. 2 illustrates a schematic diagram of an exemplary display region of the FPD of FIG. 1.
Figure 3:
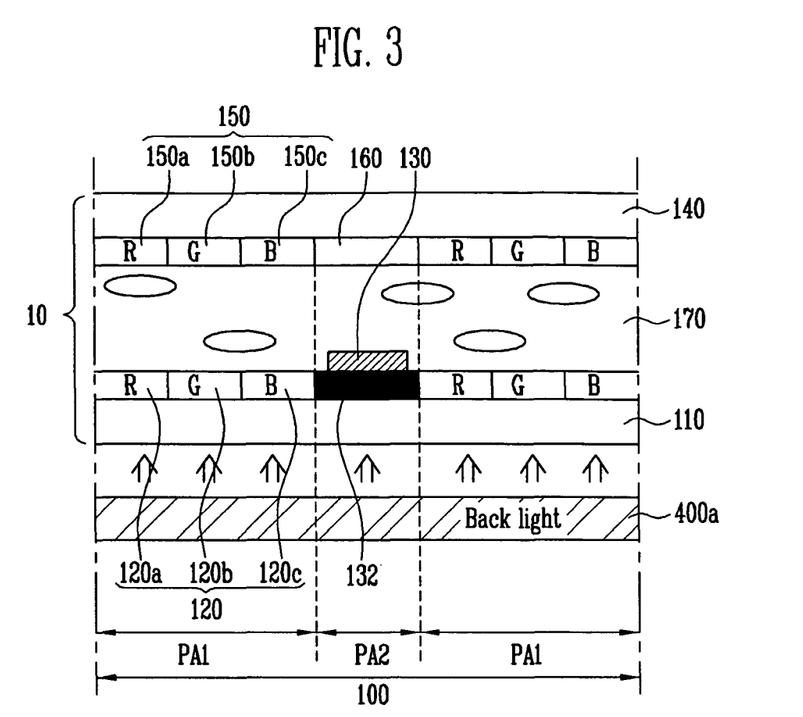
FIG. 3 illustrates a schematic of a cross-sectional diagram of an exemplary main portion of the display region of FIG. 2.

FIG. 1 illustrates a schematic diagram of an exemplary embodiment of a flat panel display (FPD) including a built-in touch screen. FIG. 2 illustrates a schematic diagram of an exemplary display region of the FPD of FIG. 1. FIG. 3 illustrates a schematic of a cross-sectional diagram of an exemplary main portion of the display region of FIG. 2.

In the exemplary embodiment of FIG. 1, a liquid crystal display (LCD) including a built-in touch screen is employed as an exemplary FPD. However, embodiments are not limited to LCDs. For example, one or more features described herein may be applied to an organic light emitting display (OLED) including a built-in touch screen.

Referring to FIG. 1, the LCD including the built-in touch screen may include a display region 100, a gate driver 200, a data driver 300, and a backlight unit 400. The display region 100 may include a plurality of unit pixels 120 (see FIG. 2) for displaying an image. The gate driver 200 may sequentially supply pixel scan signals to the unit pixels 120 through gate lines G1 to Gn. The data driver 300 may supply data signals to the unit pixels 120 through data lines D1 to Dm. The backlight unit 400 may radiate light onto the display region 100. The backlight unit 400 may include a backlight 400a and a backlight controller 400b. The backlight 400a may include a plurality of lamps positioned on a rear surface of a liquid crystal panel 10 (see FIG. 3) where the display region 100 is formed and may supply light to the display region 100. The backlight controller 400b may control the backlight 400a.

In embodiments, FPDs including a built-in touch screen in which a display panel and a touch screen panel are integrated with each other may be provided. In the LCD of FIG. 1, a plurality of photodiodes 130 (see FIG. 2), i.e., photo sensors, may be arranged, e.g., in a predetermined pattern, between the unit pixels 120 of the display region 100.

In such embodiments, the FPD including the built-in touch screen, e.g., the LCD of FIG. 1, may include a sensor scan driver 500 and/or a position detecting unit 600. The sensor scan driver 500 may drive the photodiodes 130 and may be employed in the function of the touch screen. The position detecting unit 600 may sense a change in optical current that flows through the photodiodes 130 when a touch event is generated to detect a touch position.

More particularly, e.g., the sensor scan driver 500 may sequentially supply sensor scan signals to the photodiodes 130 in units of rows through sensor scan lines PS1 to PSk to drive the photodiodes 130. The position detecting unit 600 may sense the optical current that flows through the photodiodes 130 through sensing lines S1 to Si coupled to the photodiodes 130 and may determine a change in the optical current to detect the touch position.

Referring to FIG. 2, a plurality of unit pixels 120 may be arranged in the display region 100 and photodiodes 130 may be arranged adjacent to the unit pixels 120. More particularly, e.g., one or more of the photodiodes 130 may be provided for each pixel group PG. Each pixel group PG may include at least one of the unit pixels 120. Referring to FIG. 2, the photodiodes 130 may be arranged between the unit pixels 120. For example, each pixel group PG may include four of the unit pixels 120, each pixel group PG may be associated with one of the photodiodes 130, and the respective photodiode 130 may be arranged therebetween. More particularly, in the exemplary embodiment of FIG. 2, e.g., one of the photodiodes 130 may be provided for each of the pixel groups PG, each of which may include first to fourth unit pixels P1, P2, P3, and P4. The unit pixels 120 may be arranged in a predetermined pattern, e.g., matrix pattern, in the display region 100. While FIG. 2 illustrates an exemplary arrangement, embodiments are not limited thereto as, e.g., more than one of the photodiodes 130 may be associated with each of the pixel groups PG, and/or each of the pixel groups PG may include a different number of the unit pixels 120.

More particularly, e.g., each of the unit pixels 120 may include a plurality of sub-pixels that emit light components of different colors, e.g., an R sub-pixel 120a that emits red R light, a G sub-pixel 120b that emits green G light, and a B sub-pixel 120c that emits blue B light.

Referring to FIG. 2, the photodiodes 130 may be, e.g., uniformly arranged in a matrix pattern between the unit pixels 120. When the ratio of the number of photodiodes 130 to the number of unit pixels 120 is 1:1, the arrangement density of the photodiodes 130 may be maximized. That is, e.g., the ratio of the number of photo sensors 130 to the number of unit pixels 120 may be freely set to be no more than 1:1.

A black matrix 132 may be provided under each of the photodiodes 130. The black matrix 132 may prevent light from the adjacent unit pixels P1, P2, P3, P4 or the backlight from directly reaching the respective photodiode 130.

In embodiments, the unit pixels 120 and the photodiodes 130 may be integrated with each other in one panel. For example, the unit pixels 120 and the photodiodes 130 may be formed on a bottom substrate 110 of a liquid crystal panel 10, as illustrated in FIG. 3.

Referring to FIG. 3, the liquid crystal panel 10 may include the bottom substrate 110, a top substrate 140, and a liquid crystal layer 170. The liquid crystal panel 10 may be arranged on one side of the backlight 400a. The top substrate 140 may be arranged on the bottom substrate 110 facing the bottom substrate 110. The liquid crystal layer 170 may be interposed between the bottom substrate 110 and the top substrate 140.

In addition, although not shown in FIG. 3, a pair of alignment layers for aligning an arrangement direction of the liquid crystal molecules of the liquid crystal layer 170 may be formed between the bottom and top substrates 110 and 140 to interpose the liquid crystal layer 170. Although not shown, a front surface polarityizing plate and a rear surface polarityizing plate may be provided to face both sides of the liquid crystal panel 10.

In the exemplary embodiment illustrated in FIG. 3, the photodiode 130 for detecting a position of an object that contacts the liquid crystal panel 10 is provided on a top surface of the bottom substrate 110 that faces the liquid crystal layer 170. Embodiments are not limited thereto.

Referring to FIG. 3, the photodiodes 130 may be arranged in the display region 100 on the bottom substrate 110. In the exemplary embodiment of FIGS. 2 and 3, the photodiodes 130 are regularly arranged in the display region 100 on the bottom substrate 100. The photodiodes 130 may be employed by the touch screen.

More particularly, FIG. 3 illustrates one section of the liquid crystal panel 10 including one of the photodiodes 130 in the display region 100. More particularly, FIG. 3 illustrates a section of the exemplary liquid crystal panel 10 including one photodiode 130 and two unit pixels 120 adjacent to the photodiode 130. In the following description, a portion of the display region 100 in which the photodiodes 130 are formed is referred to as a sensor region PA2 and a portion of the display region 100 in which the unit pixels 120 are formed is referred to as a pixel region PA1.

The pixel region PA1 may include the plurality of unit pixels 120 for displaying an image. The unit pixels 120 may include the R, G, and B sub-pixels 120a, 120b, and 120c. The division of color may be determined by a transmission waveform characteristic of a color filter 150. The color filter 150 may be arranged to face the sub-pixels 120a, 120b, and 120c.

More particularly, R, G, and B color filters 150a, 150b, and 150c corresponding to the respective colors may be formed on the top substrate 140 in the regions corresponding the R, G, and B sub-pixels 120a, 120b, and 120c formed on the bottom substrate 110.

In some embodiments, although not shown in FIG. 3, a pixel electrode and a common electrode may be formed in the pixel region PA1. The pixel electrode and the common electrode may include a transparent electrode material. In addition, a supplemental capacitor for supplementing a liquid crystal capacity between the pixel electrode and the common electrode in accordance with the structure of a pixel and a switching element for controlling a potential applied to the pixel electrode in accordance with the potential of an input image signal may be formed in each of the sub-pixels 120a, 120b, and 120c.

The sensor region PA2 may include the photodiodes 130 regularly arranged between the pixel regions PA1. For example, the photodiodes 130 may be regularly formed on the bottom substrate 110 between the pixel regions PA1. The photodiodes 130 adjacent to the pixel region PA1 may sense a position of an object on the touch screen.

Referring still to FIG. 3, the backlight 400a may be provided on a rear surface of the bottom substrate 110. The backlight 400a may be provided to face a rear surface of the liquid crystal panel 10 to emit light to the display region 100 of the liquid crystal panel 10. Light emitted from the backlight 400a may be transmitted through the pixel region PA1 of the bottom substrate 110 and the color filter 150 to the top substrate 140 so as to display a predetermined image.

The black matrix 132 may be formed below the sensor region PA2 in the bottom substrate 110. The black matrix 132 may prevent light emitted from the backlight 400a from being directly incident on the photodiode 130.

The color filter 150 may be arranged in the region corresponding to the pixel region PA1 on a surface, e.g., rear surface, of the top substrate 140 that faces the bottom substrate 110. A light receiving unit 160 may be arranged in the sensor region PA2 on, e.g., the same surface of the top substrate 140. External light may be incident on the light receiving unit 160.

The light receiving unit 160 may be, e.g., an opening and/or a transmission layer between the color filters 150 so that the external light may be incident on the photodiodes 130. When the external light is blocked by the contact object, an amount of change in light as a result of the portion blocked by an object on the touch screen may be sensed through the respective photodiodes 130 to determine whether the object is touching the panel 10 and/or where the object is positioned.

Further, e.g., in embodiments in which the FPD with the built-in touch screen includes an OLED instead of the LCD described above with regard to FIG. 3, additional backlight and color filter are not provided and the photodiodes 130 may be regularly arranged between the unit pixels 120. In such cases, the unit pixels 120 may include, e.g., self-emitting elements of different colors in the respective sub-pixels.

As described above, in embodiments, the photodiodes 130 may be formed on the bottom substrate 110 of the display panel where the unit pixels 120 are formed. That is, in embodiments, the photodiodes 130 may be integrated with the display panel to realize the FPD with the photo sensor type built-in touch screen so that optical characteristics of the FPD may be improved, manufacturing cost may be reduced, and/or a size, e.g., thickness, of the FPD may be reduced.

Figure 4:
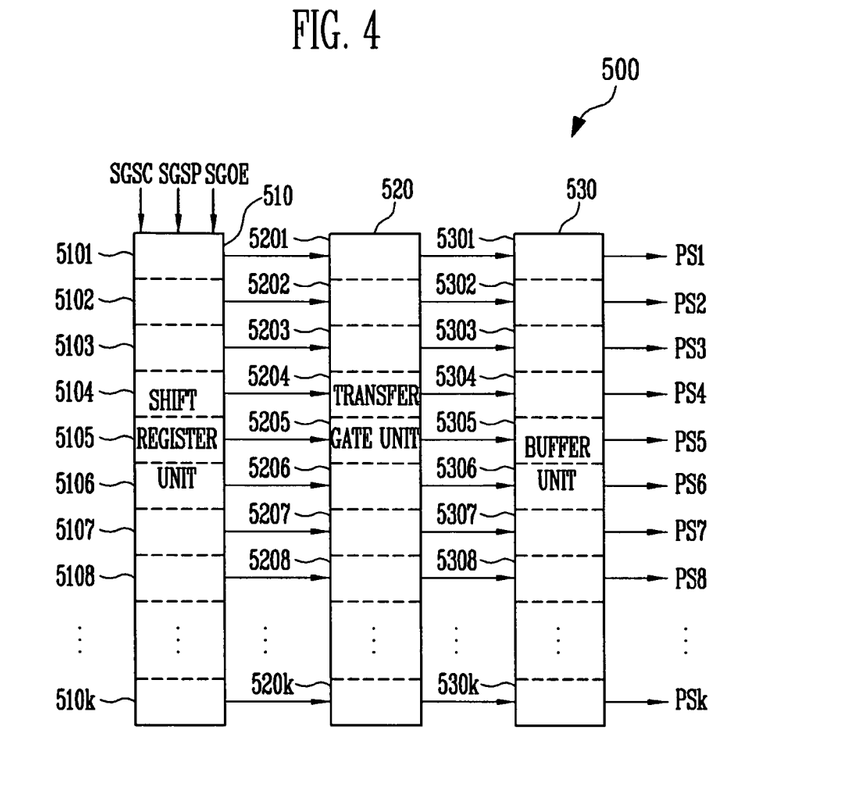
FIG. 4 illustrates a schematic diagram of an exemplary embodiment of the sensor scan driver of FIG. 1.
Figure 5:
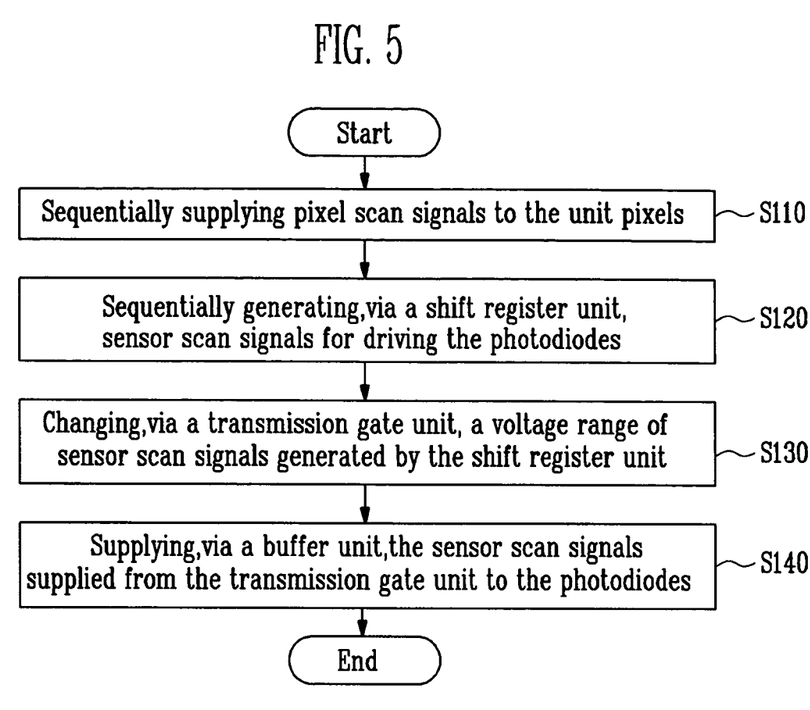
FIG. 5 illustrates a flow chart of an exemplary embodiment of a method of driving the exemplary FPD of FIG. 1.

FIG. 4 illustrates a schematic diagram of an exemplary embodiment of the sensor scan driver 500 of FIG. 1. For convenience, in the following description, it is assumed that the sensor scan driver 500 of FIG. 4 has k channels. FIG. 5 illustrates a flow chart of an exemplary embodiment of a method of driving the exemplary FPD of FIG. 1. Further, in the following description, the exemplary embodiment of a method of driving the FPD of FIG. 1 will be described in conjunction with the description of FIG. 4, and it is assumed that the gate driver 200 (FIG. 1) has sequentially supplied pixel scan signals to the unit pixels 120 (S110 of FIG. 5).

Referring to FIGS. 4 and 5, the sensor scan driver 500 may include a shift register unit 510 for sequentially generating sensor scan signals for driving the plurality of photodiodes 130 (S120 of FIG. 5), a transmission gate unit 520 for changing the voltage range of the sensor scan signals generated by the shift register unit 510 (S130 of FIG. 5), and a buffer unit 530 for supplying the sensor scan signals supplied from the transmission gate unit 520 to the photodiodes through sensor scan lines PS1 to PSk (S140 of FIG. 5).

The shift register unit 510 may include a sensor gate shift clock signal SGSC, a sensor gate start pulse SGSP, and a sensor gate output enable signal SGOE from a timing controller (not shown). The shift register unit 510 may sequentially generate n sampling pulses while shifting the sensor gate start pulse SGSP in response to the sensor gate shift clock signal SGSC and may sequentially generate n sensor scan signals by logically combining the generated sampling pulse with the sensor gate output enable signal SGOE. Therefore, the shift register unit 510 may include shift registers 5101 to 510k provided in the k channels, respectively.

The transmission gate unit 520 may change a voltage range of the sensor scan signals supplied from the shift register unit 510 into a voltage range suitable for the driving of the photodiodes 130. That is, the transmission gate unit 520 may change the voltage range of the sensor scan signals into a predetermined voltage range at which the photodiodes 130 may actively react to light. The voltage applied to both ends of the photodiodes 130 during optical sensing may be controlled.

For example, if the light sensitivity of the photodiodes 130 is high when a high level voltage of about 0V and a low level voltage of about −3V are respectively applied to ends of the photodiodes 130, the transmission gate unit 520 may change the low level voltage and the high level voltage of the sensor scan signals to −3V and 0V, respectively, so that the light sensitivity of the photodiodes 130 may be relatively high. That is, e.g., in such cases, −3V to 0V may be applied to both ends of the photodiodes. Similarly, e.g., the transmission gate unit 520 may change the low level voltage and the high level voltage of the sensor scan signals into 0V and 3V, respectively, so that a range of about 0V to 3V at which light sensitivity may be relatively higher. That is, in embodiments, the transmission gate unit 520 may control voltages applied to ends of the photodiodes 130 such that the photodiodes 130 may operate at a relatively high level of light-sensitivity and a larger optical current may be obtained.

Further, in some embodiments, the transmission gate unit 520 may variously change the voltage range of the sensor scan signals supplied from the shift register unit 510 into a previously set voltage range.

Referring to FIG. 4, the sensor scan signals output from the transmission gate unit 520 may be sequentially supplied to the photodiodes 130 in units of rows (or columns) via the buffer unit 530. That is, e.g., the changed sensor scan signals output from the transmission gate unit 520 may be applied to the photodiodes 130. More particularly, in embodiments, by stabilizing an output of the transmission gate unit 520, the photodiodes 130 may be stably driven. An exemplary structure of the transmission gate unit 520 will be described with respect to FIG. 6 below.

The buffer unit 530 may supply the sensor scan signals supplied from the transmission gate unit 520 to the sensor scan lines PS1 to PSk. The buffer unit 530 may include a buffer or an inverter in each of the channels.

Figure 6:
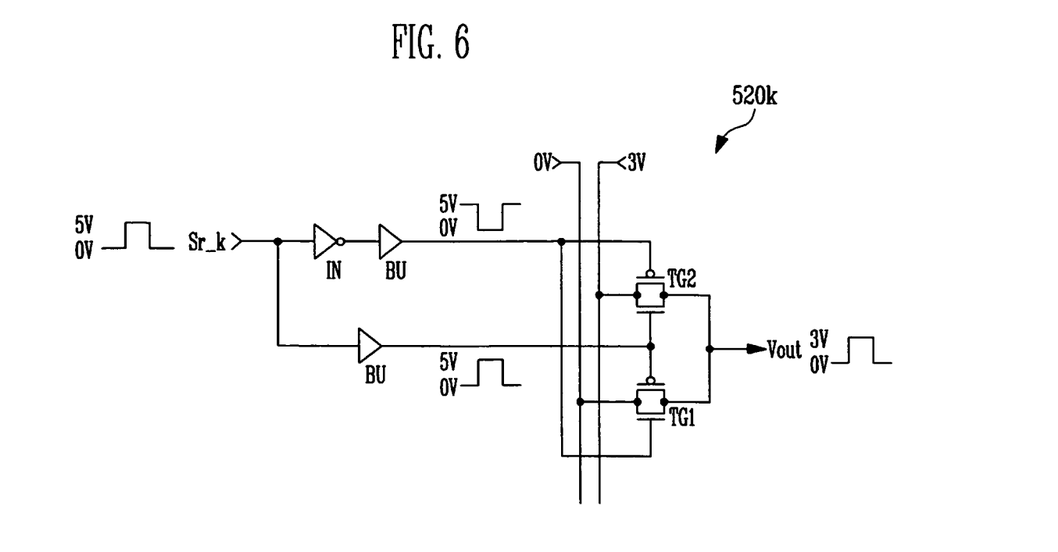
FIG. 6 illustrates a circuit diagram of an exemplary embodiment of the transmission gate unit of FIG. 4.
Figure 7:
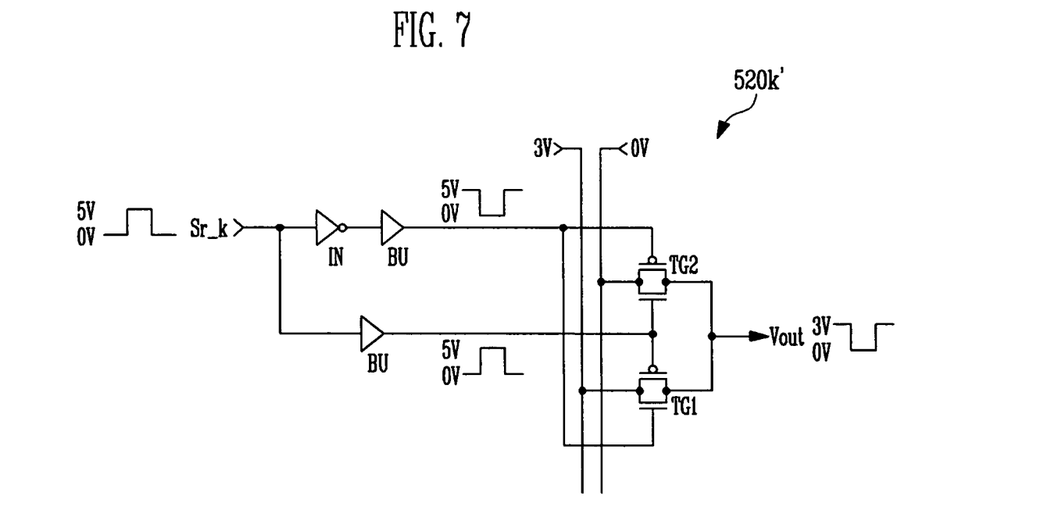
FIG. 7 illustrates a circuit diagram of another exemplary embodiment of the transmission gate unit of FIG. 4.

FIG. 6 illustrates a circuit diagram of an exemplary embodiment of the transmission gate unit 520k of FIG. 4. FIG. 7 illustrates a circuit diagram of another exemplary embodiment of the transmission gate unit 520k' of FIG. 4. As described above, the transmission gate units 520k, 520k' may supply stable outputs such that the photodiodes 130 may be stably driven, e.g., leakage current may be eliminated.

For convenience, in FIGS. 6 and 7, first and second transmission gates TG1 and TG2, an inverter IN, and a buffer BU that may be associated with a single one of the channels, for example, each of the kth channels 520k and 520k' of the transmission gate unit 520, is illustrated. However, the first and second transmission gates TG1 and TG2, the inverter IN, and the buffer BU provided in each of the channels of the transmission gate unit 520 may be coupled to each of the k channels of the shift register unit 510.

Referring to FIGS. 6 and 7, the transmission gate unit 520k, 520k' may include the first transmission gate TG1 and the second transmission gate TG2. An input terminal of the first transmission gate TG1 may be coupled to a first power source having a first voltage and an output terminal of the first transmission gate TG1 may be coupled to an output terminal of the transmission gate unit 520k, 520k'. An input terminal of the second transmission gate TG2 may be coupled to a second power source having a second voltage and an output terminal of the second transmission gate TG2 may be coupled to the output terminal of the transmission gate unit 520k, 520k'.

Referring to FIGS. 6 and 7, a positive polarity control electrode of the first transmission gate TG1 may receive an output signal Sr_k of the shift register unit 510 transmitted via the buffer BU. A negative polarity control electrode of the first transmission gate TG2 may receive an output signal of the shift register unit 510 inverted via the inverter IN.

A positive polarity control electrode of the second transmission gate TG2 may receive the output signal of the shift register unit 510 inverted via the inverter IN. A negative polarity control electrode of the second transmission gate TG2 may receive the output signal Sr_k of the shift register unit 510 transmitted via the buffer BU.

That is, at least one buffer BU may be coupled between the coupling nodes of the positive polarity control electrode of the first transmission gate TG1 and the negative polarity control electrode of the second transmission gate TG2 and the shift register unit 510 to transmit the output signal Sr_k of the shift register unit 510 to the first and second transmission gates TG1 and TG2. Further, at least one inverter IN may be coupled between the coupling nodes of the negative polarity control electrode of the first transmission gate TG1 and the positive polarity control electrode of the second transmission gate TG2 and the shift register unit 510 to transmit the signal obtained by inverting the output signal Sr_k of the shift register unit 510 to the first and second transmission gates TG1 and TG2.

A first voltage input to the first transmission gate TG1 may be set as the low level voltage of the sensor scan signals supplied to the photodiodes 130. A second voltage input to the second transmission gate TG2 may be set as the high level voltage of the sensor scan signals supplied to the photodiodes 130. For example, with regard to the exemplary transmission gate unit 520k of FIG. 6, the first voltage may be set as 0V and the second voltage may be set as 3V.

Hereinafter, an exemplary operation of the exemplary transmission gate unit 520k will be described. For convenience, it is assumed that the low level voltage of the output signal Sr_k of the shift register is 0V and that the high level voltage of the pulse for generating the sensor scan signals is 5V.

The output signal Sr_k of the shift register unit 510 may be transmitted to the positive polarity control electrode of the first transmission gate TG1 and the negative polarity control electrode of the second transmission gate TG2 via the buffer BU. The signal inverted via the inverter IN may be transmitted to the negative polarity control electrode of the first transmission gate TG1 and the positive polarity control electrode of the second transmission gate TG2.

During a period where the output signal Sr_k of the shift register unit 510 is 0V, the voltage of 5V may be transmitted to the negative polarity control electrode of the first transmission gate TG1 and the first transmission gate TG1 may be turned on so that the output signal Vout of 0V is output.

During a period where the output signal Sr_k of the shift register unit is 5V, the voltage of 0V may be transmitted to the positive polarity control electrode of the second transmission gate TG2 and the second transmission gate TG2 may be turned on so that the output signal Vout of 3 v is output.

That is, a voltage range of the output signal Sr_k of the shift register unit 520k may be changed to the range of the first voltage, e.g., 0V, to the second voltage, e.g., 3V, via the transmission gate unit 510.

On the other hand, the first voltage input to the first transmission gate TG1 may be set as the high level voltage of the sensor scan signals supplied to the photodiodes 130 and the second voltage input to the second transmission gate TG2 may be set as the low level voltage of the sensor scan signals supplied to the photodiodes 130. For example, with regard to the exemplary transmission gate unit 520k' of FIG. 7, the first voltage may be set as 3V and the second voltage may be set as 0V.

In such cases, the voltage range of the output signal Sr_k of the shift register unit may be changed by the transmission gate unit 520k' and the waveform of the output signal Sr_k may be inverted.

Designs may be variously changed in accordance with the driving conditions of the photodiodes 130 so that the photodiodes 130 may operate in a positive bias mode or in a reverse bias mode in accordance with a coupling direction of the photodiodes 130.

When the voltage range of the sensor scan signals output from the shift register unit 510 is changed by adopting the above-described transmission gate unit 520, a noise margin that may be generated when a voltage range is changed using, e.g., a conventional level shifter, may not exist and a pulse between the high level voltage and the low level voltage may be stably output.

That is, by employing a transmission gate unit, e.g., 520, including one or more features described above, a voltage range may be changed and stably output such that driving signals for sequentially driving the photodiodes, e.g., 130, may be stably supplied to the photodiodes.

Embodiments may enable light sensitivity of photodiodes to be improved and, as a result, function of a touch screen employing photodiodes driven as described above to be improved.

Further, in embodiments, shift registers included in a shift register unit may output pulses maintained for a longer period than one horizontal period 1H, for example, two horizontal periods 2H in accordance with an internal circuit structure. In such cases, output signals of the shift registers may be changed into the pulses maintained for one horizontal period 1H using a NAND operation before being output.

Figure 8:
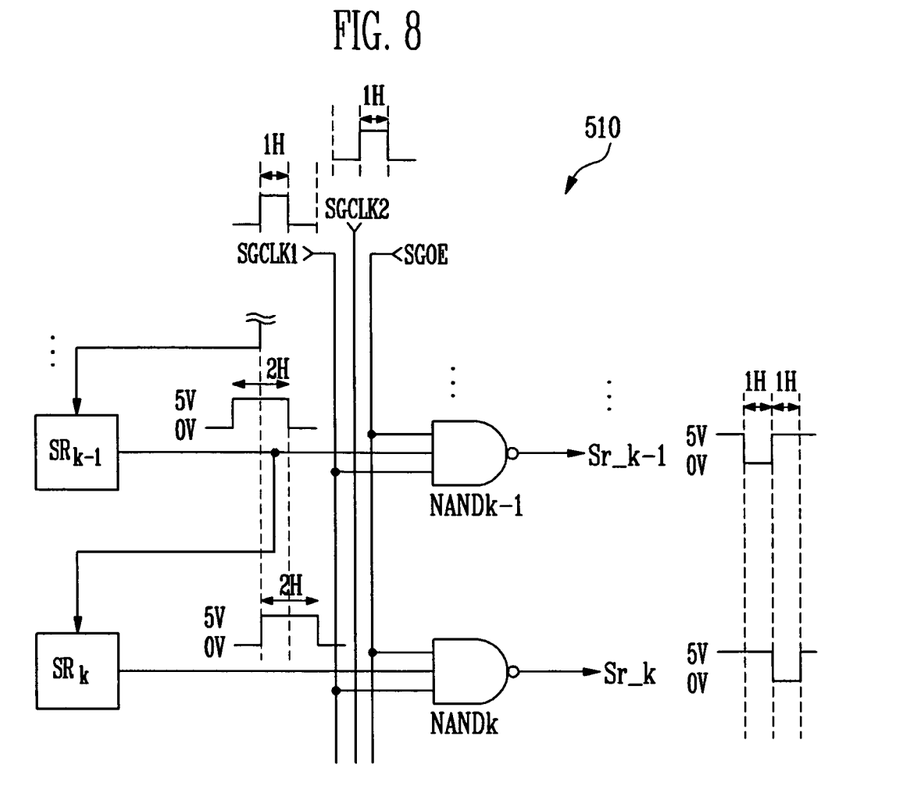
FIG. 8 illustrates a schematic diagram of an exemplary embodiment of the shift register unit of FIG. 4.

FIG. 8 illustrates a schematic diagram of an exemplary embodiment of the shift register unit 510 of FIG. 4.

For example, as illustrated in FIG. 8, the shift register unit 510 may further include NAND gates coupled to output lines of the shift registers SR to limit a width of pulses output from the shift register SR. For convenience, only the (k–1)th channel and the k-th channel of the shift register unit 510 is illustrated in FIG. 8.

Referring to FIG. 8, the shift register unit 510 may include a plurality of shift registers SR included in the channels and a plurality of NAND gates NAND coupled between the output lines of the plurality of shift registers SR and the corresponding channels of the transmission gate units. In such embodiments, the NAND gates NAND may receive the output signal of the shift register SR of the corresponding channel, a first or second sensor gate clock signal SGCLK1 or SGCLK2, and a sensor gate output enable signal SGOE and may perform a NAND operation on the three signals to output the NAND operation result to the transmission gate unit.

The first sensor gate clock signal SGCLK1 and the second sensor gate clock signal SGCLK2 may be sequentially delayed and may be set to have a pulse width of the sensor scan signals to be supplied to the photodiodes 130, e.g., a pulse width corresponding to one horizontal period 1H. The first and second sensor gate clock signals SGCLK1 and SGCLK2 may be alternately supplied to the NAND gates NAND. For example, odd NAND gates may receive the first sensor gate clock signal SGCLK1 to be driven and even NAND gates may receive the second sensor gate clock signal SGCLK2 to be driven.

The output signals of the shift registers SR may have a pulse width limited to the width corresponding to the first and second sensor gate clock signal SGCLK1 or SGCLK2 and may be inverted via the NAND gates NAND before being output. Therefore, in such cases, the input waveform and the output waveform of the transmission gate unit illustrated in FIGS. 6 and 7 may be inverted.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A sensor scan driver, comprising:
   a shift register unit adapted to sequentially generate sensor scan signals for driving a plurality of photodiodes;
   a transmission gate unit adapted to change a voltage range of sensor scan signals generated by the shift register unit; and
   a buffer unit adapted to supply the sensor scan signals supplied from the transmission gate unit to the photodiodes,
   wherein the transmission gate unit, includes:
      a first transmission gate including a positive polarity control electrode that is adapted to receive an output signal of the shift register unit, a negative polarity control electrode that is adapted to receive a signal obtained by inverting the output signal of the shift register unit, an input terminal coupled to a first power source having a first voltage, and an output terminal coupled to an output terminal of the transmission gate unit; and
      a second transmission gate including a positive polarity control electrode that is adapted to receive the signal obtained by inverting the output signal of the shift register unit, a negative polarity control electrode that is adapted to receive the output signal of the shift register unit, an input terminal coupled to a second power source having a second voltage, and having an output terminal coupled to the output terminal of the transmission gate unit.

2. The sensor scan driver as claimed in claim 1, wherein the first voltage is set as a low level voltage of the sensor scan signals supplied to the photodiodes, and wherein the second voltage is set as a high level voltage of the sensor scan signals supplied to the photodiodes.

3. The sensor scan driver as claimed in claim 1, wherein the first voltage is set as the high level voltage of the sensor scan signals supplied to the photodiodes, and wherein the second voltage is set as the low level voltage of the sensor scan signals supplied to the photodiodes.

4. The sensor scan driver as claimed in claim 1, wherein the transmission gate unit comprises:
   at least one buffer coupled between coupling nodes of the positive polarity control electrode of the first transmission gate and the negative polarity control electrode of the second transmission gate and the shift register unit to transmit the output signal of the shift register unit to the first and second transmission gates; and
   at least one inverter coupled between coupling nodes of the negative polarity control electrode of the first transmission gate and the positive polarity control electrode of the second transmission gate and the shift register unit to transmit the signal obtained by inverting the output signal of the shift register unit to the first and second transmission gate.

5. The sensor scan driver as claimed in claim 1, wherein the first and second transmission gates are coupled to each channel of the shift register unit.

6. The sensor scan driver as claimed in claim 1, wherein the shift register unit comprises:
   a plurality of shift registers provided in each channel; and
   a plurality of NAND gates coupled between the output lines of the plurality of shift registers and the corresponding channels of the transmission gate unit,
   wherein each of the NAND gates performs a NAND operation on three signals of the output signal of the shift register of the corresponding channel, a first or second sensor gate clock signal, and a sensor gate output enable signal to output a NAND operation result to the transmission gate unit.

7. The sensor scan driver as claimed in claim 6, wherein the plurality of NAND gates alternately receive the sequentially delayed first or second sensor gate clock signal.

8. A flat panel display (FPD) including a built-in touch screen, comprising:
   a plurality of unit pixels regularly arranged in a display region;
   photodiodes adjacent to unit pixels in units of pixel groups each including at least one unit pixel among the unit pixels;
   a gate driver for sequentially supplying pixel scan signals to the unit pixels; and
   a sensor scan driver for sequentially supplying the sensor scan signals to the photodiodes,
   wherein the sensor scan driver, includes:
      a shift register unit for sequentially generating sensor scan signals for driving the photodiodes;
      a transmission gate unit for changing a voltage range of sensor scan signals generated by the shift register unit; and
      a buffer unit for supplying the sensor scan signals supplied from the transmission gate unit to the photodiodes,
      wherein the transmission gate unit includes:
         a first transmission gate having a positive polarity control electrode receive an output signal of the shift register unit, having a negative polarity control electrode receive a signal obtained by inverting the output signal of the shift register unit, having an input terminal coupled to a first power source having a first voltage, and having an output terminal coupled to an output terminal of the transmission gate unit; and
         a second transmission gate having a positive polarity control electrode receive a signal obtained by inverting the output signal of the shift register unit, having a negative polarity control electrode the output signal of the shift register unit, having an input terminal coupled to a second power source having a second voltage, and having an output terminal coupled to the output terminal of the transmission gate unit.

9. The FPD as claimed in claim 8,
wherein the first voltage is set as a low level voltage of the sensor scan signals supplied to the photodiodes, and
wherein the second voltage is set as a high level voltage of the sensor scan signals supplied to the photodiodes.

10. The FPD as claimed in claim 8,
wherein the first voltage is set as a high level voltage of the sensor scan signals supplied to the photodiodes, and
wherein the second voltage is set as a low level voltage of the sensor scan signals supplied to the photodiodes.

11. The FPD as claimed in claim 8, wherein the transmission gate unit comprises:
at least one buffer coupled between coupling nodes of the positive polarity control electrode of the first transmission gate and the negative polarity control electrode of the second transmission gate and the shift register unit to transmit the output signal of the shift register unit to the first and second transmission gates; and
at least one inverter coupled between coupling nodes of the negative polarity control electrode of the first transmission gate and the positive polarity control electrode of the second transmission gate and the shift register unit to transmit the signal obtained by inverting the output signal of the shift register unit to the first and second transmission gate.

12. The FPD as claimed in claim 8, wherein a ratio of a number of photodiodes to a number of unit pixels is no more than 1:1.

13. The FPD as claimed in claim 8, wherein the unit pixels include a plurality of sub-pixels that emit light components of different colors.

14. The FPD as claimed in claim 8, wherein the unit pixels and the photodiodes are formed on a same substrate.

15. A method for driving a flat panel display (FPD), the flat panel including a built-in touch screen, a plurality of unit pixels regularly arranged in a display region, a plurality of photodiodes adjacent to unit pixels in units of pixel groups each including at least one unit pixel among the unit pixels, the method comprising:
sequentially supplying pixel scan signals to the unit pixels;
sequentially generating, via a shift register unit, sensor scan signals for driving the photodiodes;
changing, via a transmission gate unit, a voltage range of sensor scan signals generated by the shift register unit; and
supplying, via a buffer unit, the sensor scan signals supplied from the transmission gate unit to the photodiodes,
wherein the transmission gate unit includes:
a first transmission gate having a positive polarity control electrode receive an output signal of the shift register unit, having a negative polarity control electrode receive a signal obtained by inverting the output signal of the shift register unit, having an input terminal coupled to a first power source having a first voltage, and having an output terminal coupled to an output terminal of the transmission gate unit; and
a second transmission gate having a positive polarity control electrode receive a signal obtained by inverting the output signal of the shift register unit, having a negative polarity control electrode the output signal of the shift register unit, having an input terminal coupled to a second power source having a second voltage, and having an output terminal coupled to the output terminal of the transmission gate unit.

* * * * *